Patented Apr. 18, 1933

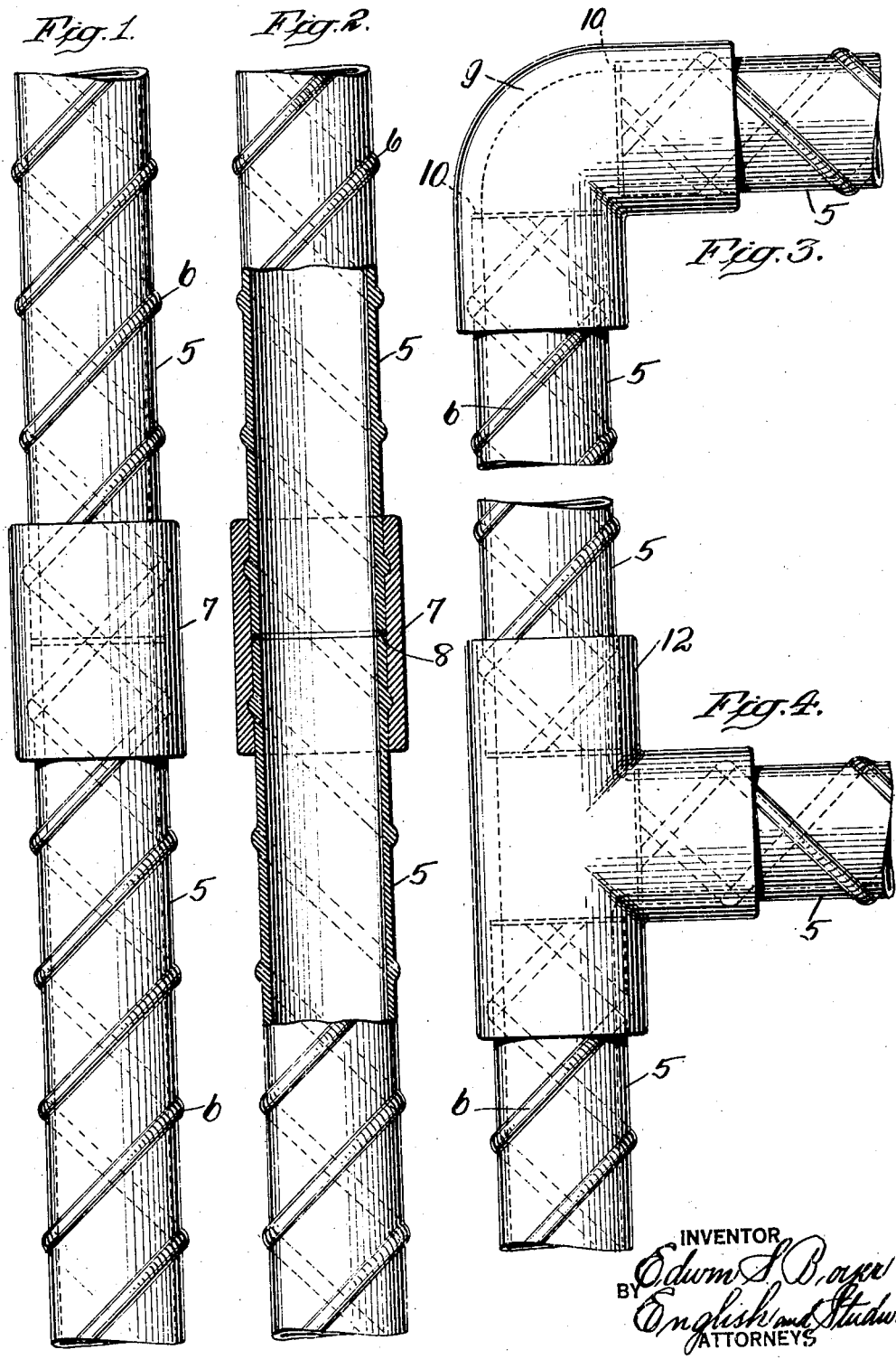

1,904,675

UNITED STATES PATENT OFFICE

EDWIN S. BOYER, OF PLAINFIELD, NEW JERSEY, ASSIGNOR TO AMERICAN HARD RUBBER COMPANY, OF NEW YORK, N. Y., A CORPORATION OF NEW YORK

PIPE

Application filed April 13, 1931. Serial No. 529,706.

The invention relates to improved means for forming or constructing a line of piping and/or repairing damaged portions thereof. The invention has been developed in response to a demand for a more convenient means for making and repairing piping in mines and similar places where the necessary tools for cutting threads on the pipe ends and related parts are not ordinarily found and where the provision and use of such tools are inconvenient and often impossible. For example, a line of piping through which water is pumped from the bottom of a mine to the surface will pass through several floors or levels. It is not convenient, nor desirable from the standpoint of operating expense, to maintain a repair kit including thread cutting tools at each level, and sometimes it is only possible to have one at the surface level or adit of the mine. Consequently, when a break occurs in the piping at some distance from the repair tools or in a situation where it is difficult to use thread cutting tools, much time is lost in repairing the break. This difficulty is obviated by the improved pipe of the present invention.

The preferred embodiment of the improved pipe is illustrated in the accompanying drawing in which Fig. 1 is an elevation of the ends of two abutting pipes connected by a straight coupling member; Fig. 2 is a view similar to Fig. 1, but with the middle portion shown in section; Fig. 3 is an elevation of two pipe ends connected by an elbow; and Fig. 4 is an elevation of three pipe ends connected by a T.

The invention consists in providing pipe sections throughout their entire length with an external spiral or helix, preferably formed integral with the substance which composes the pipe. The spiral or helix may be a single or plural thread as desired. With the pipe sections thus preformed, the problem of joining together a number of the pipe sections to build up a new system of piping or of repairing a damaged system or piping composed of sections of the improved pipe is much simplified. It is necessary to be provided with only a saw or similar cutting tool for dividing the pipe sections into the required lengths. Since the pipe sections are provided throughout their entire lengths with the single or plural threads, the pipe sections may be cut at any point and connected to the coupling members, thus entirely doing away with the necessity for providing thread cutting tools.

Referring more particularly to the drawing, the pipe sections are indicated at 5 and in form are the usual cylindrical tubes ordinarily used for piping. The pipe sections may be of any convenient length, and in the drawing only the ends of adjacent pipe sections are shown. The spiral or helix which extends throughout the entire length of the pipe sections is indicated at 6, and is preferably formed integrally with the material composing the pipe sections and constitutes a ridge on the exterior surface of the pipe sections. In the drawing the spiral ridge is shown as a double thread, but it may be a single thread or even a triple thread.

Where a straight line of piping is to be constructed or repaired the ends of the abutting pipe sections will be connected by a straight coupling as indicated at 7 in Figs. 1 and 2. Between the abutting ends of the pipe sections is preferably interposed a gasket or washer 8. Where a bend is to be made in the line of piping the adjacent ends of the pipe sections will be joined by an elbow, as indicated at 9 in Fig. 3. The interior of the elbow 9 may be formed with the shoulders 10 to provide seats for washers or gaskets against which the ends of the pipe sections may be forced. And where a straight line of piping is to be provided with a branch, a T 12 will be used, as indicated in Fig. 4. The T 12 will have shoulders formed therein to provide seats against which the ends of the pipe sections will be forced. It will be understood that the straight coupling member 7, the elbow 9, the T 12 or any other coupling member to be employed for connecting the pipe ends, will be provided with internal threads corresponding in pitch and arrangement to the external threads on the pipe sections.

Although the improved pipe constituting the subject of the present invention may be composed of any suitable material, I prefer to form it of hard rubber or similar plastic compound, in order that the line of piping constructed from the improved pipe sections may be adapted for a large number of purposes for which the usual pipe materials are not suitable, as for example, processing and transportation of solutions giving acid and alkali reactions and also solutions containing solids which have an abrasive action on the piping.

Having thus described the invention and how it is to be used, what I claim as new is:—

In the art of pipes for use in mining and the like formed of plastic compound and of cylindrical form, each pipe having smooth interior and exterior surfaces, means for repairing a broken pipe comprising a coupling internally spirally grooved for the reception of the pipe ends and a spiral ridge on the outer smooth surface of each pipe extending the full length thereof whereby a coupling may be applied to a pipe at any point over the length thereof.

EDWIN S. BOYER.